United States Patent [19]

Maiorana

[11] Patent Number: 5,063,892

[45] Date of Patent: Nov. 12, 1991

[54] SYSTEM FOR BALANCING A FOUR-STROKE INTERNAL COMBUSTION ENGINE

[75] Inventor: Giovanni Maiorana, Biella, Italy

[73] Assignee: Fiat Auto SPA, Turin, Italy

[21] Appl. No.: 580,452

[22] Filed: Sep. 11, 1990

[30] Foreign Application Priority Data

Sep. 11, 1989 [IT]   Italy ................................ 67755 A/89

[51] Int. Cl.$^5$ ............................................ F02B 75/06
[52] U.S. Cl. .................................. 123/192 B; 74/603
[58] Field of Search ........................ 123/192 B; 74/603

[56] References Cited

U.S. PATENT DOCUMENTS 4,552,104  11/1985  Hara et al. ............................ 74/603
4,785,772  11/1988  Krotky et al. .................. 123/192 B

*Primary Examiner*—Noah P. Kamen
*Attorney, Agent, or Firm*—Sughrue, Mion, Zinn, Macpeak & Seas

[57] ABSTRACT

A system balancing an internal combustion engine, particularly a four-stroke engine with five cylinders in line, in which two of the counterweights for balancing the crankshaft have asymmetric geometry defined by an additional mass in each case. The respective centers of gravity of the two additional masses are situated in the plane containing the resultant moment of the rotary components of the first-order alternating forces and the centrifugal forces of the rotating masses.

2 Claims, 1 Drawing Sheet

SYSTEM FOR BALANCING A FOUR-STROKE INTERNAL COMBUSTION ENGINE

BACKGROUND OF THE INVENTION

The present invention relates in general to internal combustion engines, particularly four-stroke motor-vehicle engines with five cylinders in line, each including a crankshaft with crank pins which are equi-angularly spaced around the axis of the shaft and provided with balancing counterweights.

In engines of this type, there is a problem in balancing the resultant moments of the centrifugal forces of the rotating masses and the rotary components of the first-order alternating forces.

Balancing systems are known for this purpose which have counterweights designed so that each has a static moment opposed to that of the respective crank pin. This solution, however, involves the use of very large counterweights which are sometimes incompatible with the space available for the installation of the engine in the vehicle. In fact, in order to balance the said moments, which are indicated $M_c$ below, it is necessary for the counterweights to achieve a static moment $m_s$ given by the formula:

$$M_c = a \cdot i \cdot m_s \omega^2$$

where a is a coefficient which depends on the engine type (for example a=0.449 for a five-cylinder, in-line engine), and i is the interaxial spacing of the cylinders.

$m_s$ is therefore large since a and i are small.

SUMMARY OF THE INVENTION

The object of the present invention is to avoid the aforesaid problem and to provide a system for balancing an engine of the type defined above which enables the resultant moment of the centrifugal forces and the rotary components of the first order alternating forces to be balanced by means of light-weight drive shaft counterweights of low bulk, without the need for separate balancing of the flywheel and the pulley associated with the engine.

According to the invention, this object is achieved by virtue of the fact that two of the counterweights for balancing the crankshaft have assymetric geometry defined by an additional lateral mass in each case, the respective centers of gravity of the two additional masses being situated in the plane containing the resultant moment of the torques generated by the rotary components of first-order alternating forces and the centrifugal forces of the rotating masses.

As is well known, this plane can be identified in precise geometric terms by calculation and its position is characteristic of the number of cylinders in the engine. In the case of an engine with five cylinders, the plane intersects the vertical plane passing through the axis of the crankshaft at an angle of 54°.

To advantage, the two additional masses are carried by the balancing counterweights associated with the ends of the shaft.

This leads to the two additional masses having very low static moments: in fact the moment to be balanced thus becomes:

$$M_c = (ni) m'_s \omega^2$$

where $n_i$ is the lever arm expressed as a multiple of the interaxial spacing: clearly $$m'_s = a \frac{m_s}{n} \ll m_s$$

Moreover by calibrating the values of $m'_s$ one can easily adapt the same drive shaft to different alternating masses, that is, for example to Otto-cycle and Diesel-cycle versions of the same engine: it is in fact sufficient to provide corresponding cut lines at different depths for the different versions on the additional masses $m'_s$.

BRIEF DESCRIPTION OF THE DRAWINGS

The invention will now be described in detail with reference to the appended drawings, provided purely by way of non-limiting example, in which.

DETAILED DESCRIPTION OF THE INVENTION

With reference to the drawings, the crankshaft of a four-stroke motor-vehicle internal combustion engine with five cylinders in line is schematically and generally indicated 1. The crankshaft 1 is formed with five crank pins 2-6 each associated, in known manner, with a connecting-rod-piston-cylinder unit, not illustrated, of the engine. The crank pins are angularly spaced around the axis A of the shaft 1 by equal phase angles of 72° in a definite keying sequence.

Figure 1:
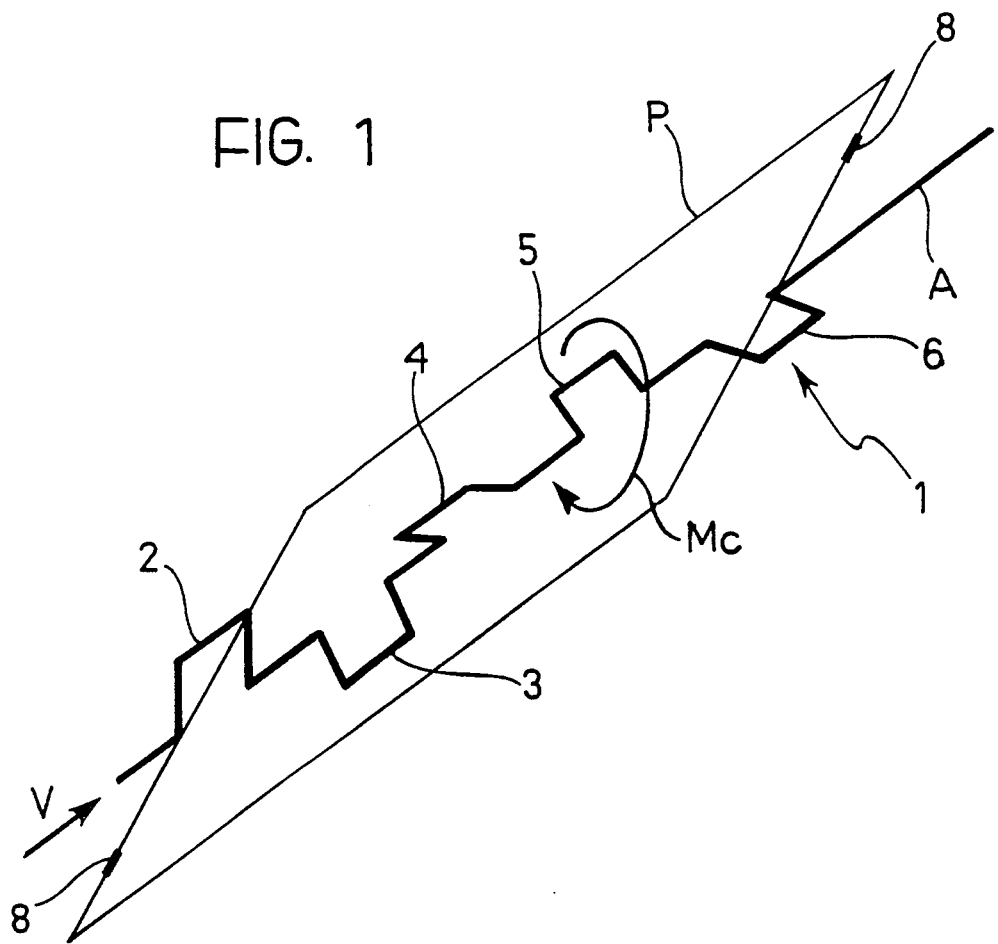
FIG. 1 is a schematic perspective view of a crankshaft provided with a balancing system according to the invention.
Figure 2:
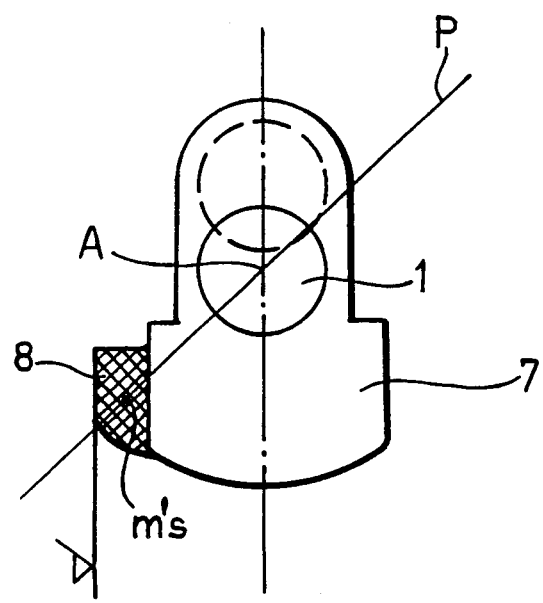
FIG. 2 is a schematic elevational view of one end of the shaft.

The crank arms or cheeks of the shaft 1 between the crank pins 2-6 are provided, in generally known manner, with balancing counterweights of which only that corresponding to one of the end crank arms of the shaft is shown at 7 in FIG. 2.

According to the invention, the end counterweight 7 has asymmetric geometry defined by an additional lateral mass 8 whose center of gravity, indicated $m'_s$, is situated in the plane P containing the resultant moment of the rotary components of the first-order alternating forces and the centrifugal forces of the rotating masses. The position of this plane is characteristic for each engine type and can be determined by calculation in a manner well known to an expert in the art.

According to the invention, the balancing counterweight associated with the crank arm at the other end of the shaft 1 also has similar asymmetric geometry due to the presence of a respective additional lateral mass 8 whose center of gravity is also situated in the said plane P.

The two additional masses 8 effectively balance the torques generated by the centrifugal forces and by the rotating components of the first-order alternating forces but with little weight and bulk: indeed, with the arrangement described above, the static moment of the two additional masses 8 may be extremely small. Moreover, the provision of cut planes at different depths of the two additional masses 8 enables the same drive shaft 1 to be adapted easily to different versions (for example Otto-cycle and Diesel-cycle) of the engine with which the shaft is used.

I claim:

1. A system for balancing a four-stroke internal combustion engine, particularly with five cylinders in line, including a crankshaft with crank pins which are angularly spaced around the axis of the crankshaft and provided with balancing counterweights, said crankshaft and balancing counterweight defining rotating masses during rotation thereof, wherein two of the balancing counterweight have asymmetric geometry defined by an additional lateral mass for each, the respective centers of gravity of the two additional lateral masses being located in the plane containing the resultant moment of the rotary components of the first-order alternating forces and the centrifugal forces of the rotating masses.

2. A system according to claim 1, wherein the two balancing counterweights with the additional masses are disposed at opposite ends of the crankshaft.

* * * * *